United States Patent
Bearden

(10) Patent No.: US 7,124,711 B1
(45) Date of Patent: Oct. 24, 2006

(54) GATE CLOSING APPARATUS

(76) Inventor: Paul D. Bearden, Rt. 1 Box 10B, Altoona, KS (US) 66710

( * ) Notice: Subject to any disclaimer, the term of this patent is extended or adjusted under 35 U.S.C. 154(b) by 175 days.

(21) Appl. No.: 11/002,507

(22) Filed: Dec. 2, 2004

(51) Int. Cl.
B60P 3/04 (2006.01)

(52) U.S. Cl. ............ 119/412; 119/415; 296/24.31

(58) Field of Classification Search ......... 119/412, 119/516, 519, 840, 843, 400, 405, 415; 296/24.31, 296/24.4, 26.03, 26.1, 26.11, 26.14; 292/262, 292/265, 266
See application file for complete search history.

(56) References Cited

U.S. PATENT DOCUMENTS

| 241,600 | A |   | 5/1881 | Bray ................. 119/412 |
| 282,706 | A |   | 8/1883 | Dahlman ............ 119/412 |
| 371,928 | A | * | 10/1887 | Davis ................ 119/415 |
| 888,844 | A | * | 5/1908 | Peters ................ 119/415 |
| 1,189,151 | A | * | 6/1916 | Madison ............. 119/415 |
| 1,215,892 | A | * | 2/1917 | Watts ................ 410/130 |
| 1,266,375 | A |   | 5/1918 | Adams ............... 119/412 |
| 1,358,573 | A |   | 11/1920 | Purvis ................. 16/80 |
| 1,796,050 | A |   | 3/1931 | Rosenberg ............. 16/82 |
| 2,052,942 | A |   | 9/1936 | Ring ................... 49/356 |
| 3,020,083 | A |   | 2/1962 | Doan et al. ......... 296/24.31 |
| 3,076,675 | A |   | 2/1963 | Lagace ................ 296/63 |
| 4,168,933 | A | * | 9/1979 | Kane ................. 414/498 |
| 4,293,158 | A |   | 10/1981 | Lewis et al. ........ 296/24.31 |
| 4,732,419 | A | * | 3/1988 | Ketterer et al. ...... 296/26.07 |
| 5,007,669 | A |   | 4/1991 | Pomerleau ........... 292/262 |
| 5,174,240 | A | * | 12/1992 | Darvill ............... 119/400 |
| 5,423,289 | A | * | 6/1995 | Larsen et al. ........ 119/520 |
| 5,924,385 | A | * | 7/1999 | Cossel ................ 119/512 |
| 5,988,721 | A | * | 11/1999 | Stenholm .......... 296/24.31 |
| 6,537,016 | B1 |   | 3/2003 | Bonsall .............. 414/537 |
| 6,863,029 | B1 | * | 3/2005 | Neufelder ........... 119/414 |
| 6,895,897 | B1 | * | 5/2005 | Culp et al. .......... 119/412 |
| 7,040,253 | B1 | * | 5/2006 | Clark et al. ......... 119/412 |
| 2006/0048715 | A1 | * | 3/2006 | Cupps ................ 119/412 |

* cited by examiner

Primary Examiner—Yvonne R. Abbott
(74) Attorney, Agent, or Firm—William R. Sharp

(57) ABSTRACT

An apparatus is provided for closing an internal divider gate in a livestock transport vehicle (i.e. trailer). The vehicle has one side with an opening. A bar is pivotally connected to the side adjacent to the opening, and is received through the opening such that the bar has an outer bar portion outside the vehicle and an inner bar portion inside the vehicle. A roller is rotatably connected to an inner end defined by the inner bar portion. A handle is preferably fixedly connected to the outer bar portion adjacent to an outer end defined by such bar portion. An operator pulls on the handle to move the outer bar portion outwardly from the side and the inner bar portion in the opposite direction to place the roller in rolling contact with the gate. The bar pushes the gate from an open position and partway to a closed position with the roller in rolling contact with the gate, the gate gaining sufficient momentum to swing the rest of the way to the closed position with the roller out of contact with the gate. The apparatus can be used to close an internal divider gate with the operator's arms outside the vehicle for optimum safety.

10 Claims, 5 Drawing Sheets

US 7,124,711 B1

GATE CLOSING APPARATUS

BACKGROUND OF THE INVENTION

This invention relates to a gate closing apparatus, and more particularly to an apparatus for closing an internal divider gate in a livestock transport vehicle, most typically a trailer.

A trailer for transporting livestock usually has at least one internal divider gate that can be closed to divide the interior of the trailer into multiple compartments. The multiple compartments are desirable for separating different types of animals, small calves and full grown cattle, bulls and cows, etc. Animals are conventionally loaded into the trailer from a chute. The operator of the trailer stands outside the trailer during the loading process, since entering the trailer during loading (especially with full grown cattle) would be extremely dangerous and also impractical when loading from the chute. The operator closes a divider gate by inserting his or her arm through an existing opening (i.e. one of multiple "window" openings) in the sidewall of the trailer, and manually pushes the gate closed. However, if an animal kicks or in any way knocks the gate back while the operator is closing the gate, this can result in serious injury to the operator's arm.

SUMMARY OF THE INVENTION

It is, therefore, an object of the invention to provide an apparatus which allows an operator to close an internal divider gate within a livestock transport vehicle (i.e. trailer) from outside the vehicle without requiring the operator to insert one of his or her arms into the vehicle.

The above object is realized in a livestock transport vehicle having opposing first and second sides, a longitudinal axis substantially parallel to the first and second sides, and at least one internal divider gate with opposing pivot and free ends of which the pivot end is pivotally mounted within the vehicle adjacent to the first side so that the gate is swingably movable through a swinging arc between (i) an open position longitudinally extending along and adjacent to the first side with the free end adjacent to the first side, and (ii) a closed position transversely extending between the pivot end adjacent to the first side and the free end adjacent to the second side to thereby define adjacent compartments within the vehicle, wherein the first side has an opening and an apparatus for moving the gate from the open position to the closed position comprises: a bar pivotally connected to the first side adjacent to the opening and received through the opening such that the bar has an outer bar portion, defining an outer end, outside the vehicle and an inner bar portion, defining an opposing inner end, inside the vehicle, wherein the bar in a retracted position when the gate is in its open position has the inner bar portion transversely positioned between and closely adjacent to the gate and first side, the inner end of the bar being adjacent to the pivot end of the gate and longitudinally positioned between such pivot end and the opening; and a roller rotatably connected to the inner end of the bar; wherein the bar is pivotable from its retracted position upon movement of the outer bar portion outwardly from the first side and associated oppositely directed movement of the inner bar portion to place the roller in rolling contact with the gate from the open position and through a first portion of its swinging arc; whereby the gate can be moved from its open position to its closed position, from outside the vehicle and with one's arms outside the vehicle, by pulling outwardly on the outer bar portion with sufficient force and speed to push the gate through the first portion of its swinging arc, with the roller in rolling contact with the gate, so as to gain adequate momentum to move through a second, remaining portion of the swinging arc and to the closed position with the roller out of contact with the gate.

Since an operator of the apparatus can close the internal divider gate with his or her arms outside of the vehicle, the possibility of injury is avoided in the event an animal in the vehicle kicks or otherwise knocks the gate back toward the open position while the operator is attempting to move the gate to its closed position.

DETAILED DESCRIPTION OF THE INVENTION

Figure 1:
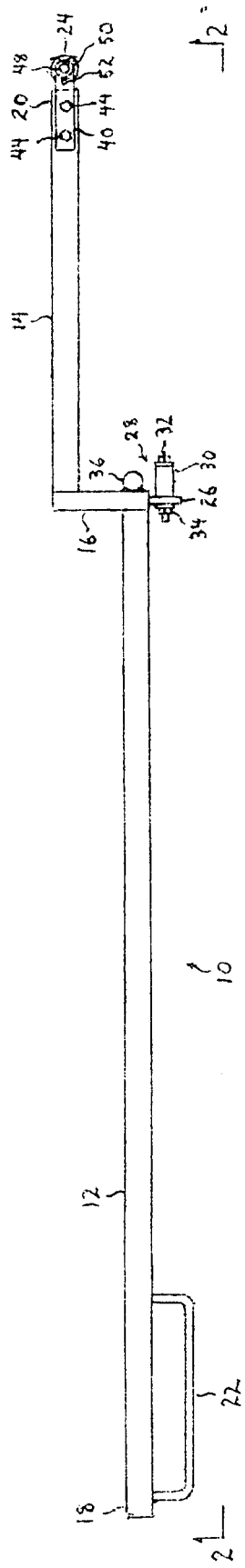
FIG. 1 is a view of a bar and associated components in accordance with one embodiment of the invention. The bar is shown apart from and unconnected to a livestock transport vehicle.

Referring to FIG. 1, bar 10 includes a bar portion 12, a bar portion 14, and an intermediate bar portion 16 connecting bar portions 12 and 14. Bar 10 has one end 18 defined by bar portion 12, and an opposing end 20 defined by bar portion 14. As shown, bar portions 12 and 14 are out of line with and offset from one another.

FIG. 1 further shows a handle 22 fixedly connected (i.e. welded) to bar portion 12 adjacent to end 18, and a roller 24 rotatably connected to end 20 in a manner that will be fully explained below. A flange 26 extends from and is welded to intermediate portion 16. A bar stop 28 includes a tubular member 30 secured to flange 26 with a bolt 32 and associated nut 34. Bolt 32 extends through tubular member 30 and a hole (not shown) in flange 26. Accordingly, bar stop 28 is fixedly connected to intermediate bar portion 16. A pivot member 36 is welded to intermediate bar portion 16 adjacent to bar stop 28. Bar stop 28 and pivot member 36 will also be further discussed with reference to subsequent FIGURES.

Figure 2:
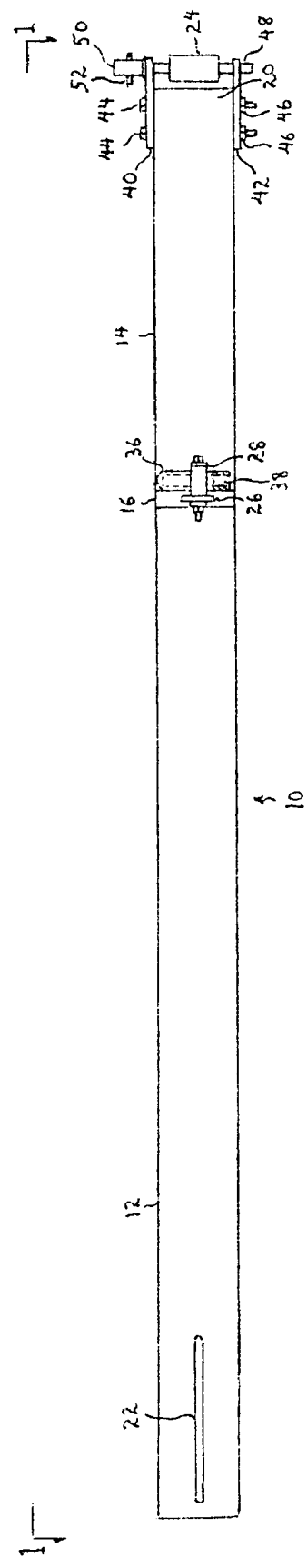
FIG. 2 is a view of the bar as viewed along line 2—2 in FIG. 1.

Referring to FIG. 2, it is clear from this FIGURE as well as the previous FIGURE that bar portions 12 and 14 are elongated. Bar portion 12 is preferably longer than bar portion 14 for leverage purposes, as will become more apparent in the course of this description. Most preferably, the ratio of the length of bar portion 12 to the length of bar portion 14 is in the range of about 2:1–3:1. A different view of handle 22, bar stop 28, and pivot member 36 is also illustrated in FIG. 2. With regard to pivot member 36, such pivot member is substantially hollow so as to have a cavity 38 defined therein. This is shown by a lower portion of pivot member 36 being in cross section, with the remainder of the pivot member having its interior surface indicated by a broken line. Pivot member 36 further has an open lower end and a closed upper end.

FIG. 2 additionally provides a clear illustration of how roller 24 is rotatably connected to end 20 of bar 10 in this particular embodiment. Opposing flanges 40 and 42 are secured to bar portion 14 at end 20 with a pair of bolts 44 and associated nuts 46. A shaft 48 is received through holes (not shown) in flanges 40 and 42. A sleeve 50 is received over an upper portion of shaft 48, and the lower end of sleeve 50 is welded to flange 40. A cotter pin 52 is received through aligned holes (not shown) in shaft 48 and sleeve 50 to affix the shaft with respect to flanges 40 and 42 and thus also end 20 to which the flanges are secured. Accordingly, shaft 48 is fixedly connected to end 20. Shaft 48 extends through roller 24, which is rotatably mounted on shaft 48 to thereby be rotatably connected to end 20. Shaft 48 and roller 24 as rotatably mounted thereon is a commercially available assembly sometimes called a shaft bearing.

The view of FIG. 1 shows flange 40, the heads of bolts 44, the upper ends of shaft 48 and sleeve 50, cotter pin 52, and the upper end of roller 24. It should be further noted that flanges 40 and 42, along with shaft 48 and roller 24, can be easily removed from end 20 of bar 10 in the event replacement or repair of the roller and shaft assembly becomes necessary.

Each of the bar portions of bar 10 is preferably comprised of rectangular tubing in the illustrated embodiment. It is further preferred that bar 10, as well as all associated components connected thereto, are of a strong and durable metallic construction.

Figure 3:
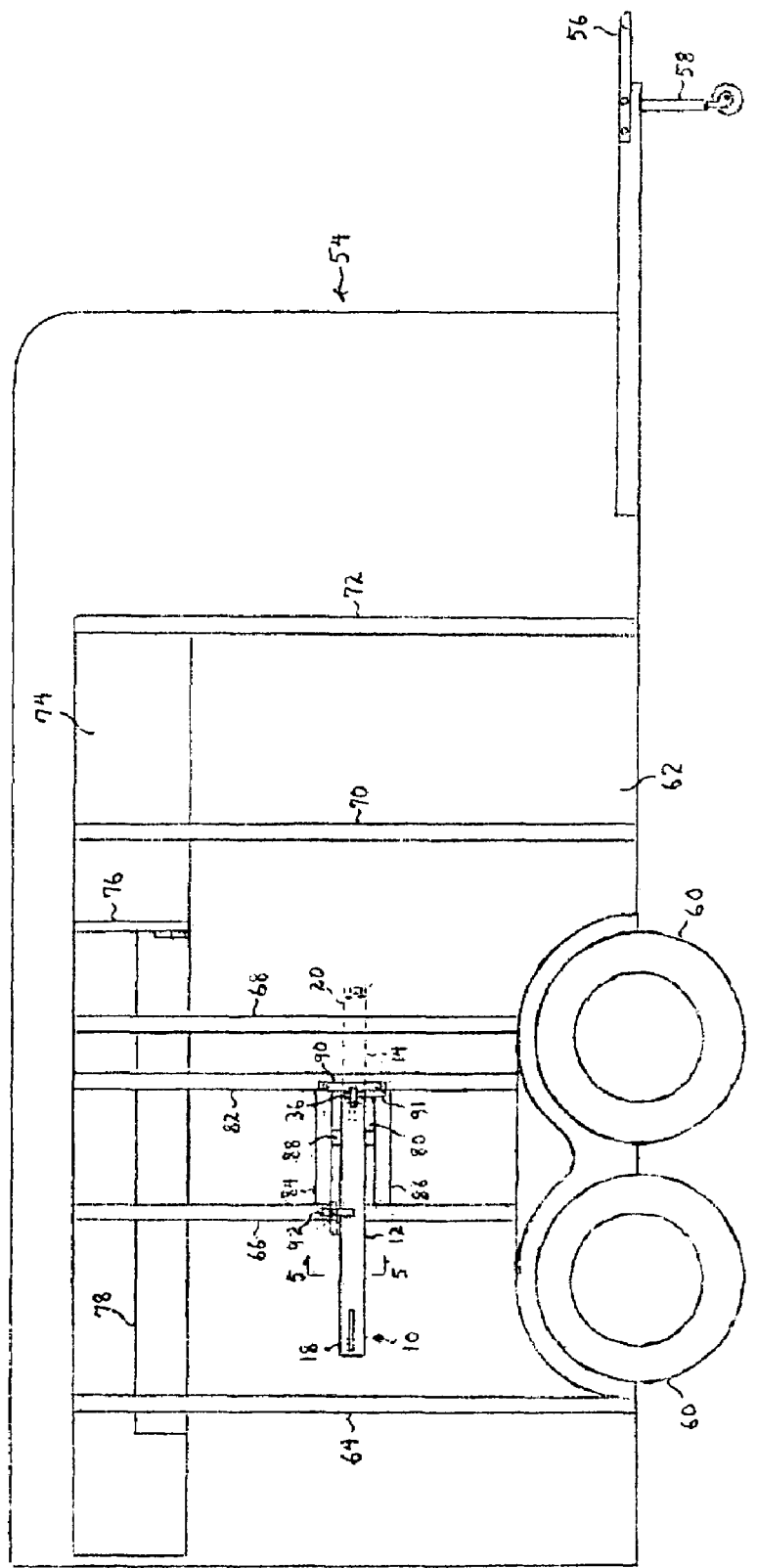
FIG. 3 is a view of one side of a livestock trailer with the bar of FIGS. 1 and 2 pivotally connected thereto in accordance with the invention. The illustrated side of the trailer is defined by a sidewall.

Referring to FIG. 3, this FIGURE illustrates a livestock trailer 54 incorporating the invention. Trailer 54 includes a hitch receiver 56 connected to the front end of the trailer. As is conventional, hitch receiver 56 is adapted to securely receive a bumper hitch on a truck or other motorized vehicle (not shown). A support member 58 is provided as shown to support the front end of trailer 54 when the trailer is not in use. Of course, support member 58 can be moved from its illustrated position in preparation for use of trailer 54 in transporting livestock. Wheels on trailer 54 are illustrated at 60.

Trailer 54 further includes a sidewall 62 that defines one side of the trailer. Vertical braces 64, 66, 68, 70, and 72, preferably comprised of rectangular tubing similar to but generally narrower than the previously described bar portions, are spaced along and affixed (i.e. by welding) with respect to sidewall 62 so as to thereby reinforce the sidewall. A number of "window" openings in sidewall 62, such as the one indicated at 74 and as defined at least in part by the above-mentioned vertical braces and the sidewall, are provided adjacent to the top of trailer 54 for ventilation and admission of light into the trailer's interior. An upper portion of a post 76 as fixedly mounted within trailer 54, and an upper portion of an internal divider gate 78 as pivotally mounted within the trailer by means of pivotal connection (i.e. with hinges) to post 76, are visible through some of the window openings. Post 76 is approximately centered between the front and rear ends of trailer 54, and divider gate 78 is in its open position in FIG. 3.

An opening 80 in sidewall 62 is provided between vertical braces 66 and 68 below the window openings. Additional braces comprised of the preferred rectangular tubing are provided for reinforcing sidewall 62 around opening 80. Such braces include vertical brace 82 substantially similar to the other vertical braces on one side of opening 80, horizontal braces 84 and 86 extending between and fixedly connected to vertical braces 66 and 82 so that portions thereof respectively border the top and bottom of opening 80, and a short vertical brace 88 extending between and fixedly connected to horizontal braces 84 and 86 on the side of opening 80 opposite vertical brace 82.

Bar 10 is pivotally connected to sidewall 62 adjacent to opening 80 by means of a pivotal connection to elongated connection member 90, which is bolted to vertical brace 82 and sidewall 62. The pivotal connection is provided by a pivot assembly 91 which includes pivot member 36 and another pivot member, as is discussed more fully below. Bar 10 is received through opening 80 such that bar portion 12 is outside trailer 54 and bar portion 14 (indicated by broken lines) is inside the trailer. Accordingly, bar portion 12 is hereafter called the "outer" bar portion and bar portion 14 the "inner" bar portion. End 18 is hereafter called the "outer" end and end 20 the "inner" end.

Finally with respect to FIG. 3, a latch member 92 is pivotally mounted to vertical brace 66. Latch member 92 is shown in solid lines as extending over and preferably engaging outer bar portion 12 to hold bar 10 in its illustrated retracted position when the bar is not being used to close gate 78. The "retracted" position of bar 10 will be clearly defined with reference to FIG. 6. As indicated by broken lines in FIG. 3, latch member 92 can be pivoted to a position in which it does not extend over outer bar portion 12.

Figure 4:
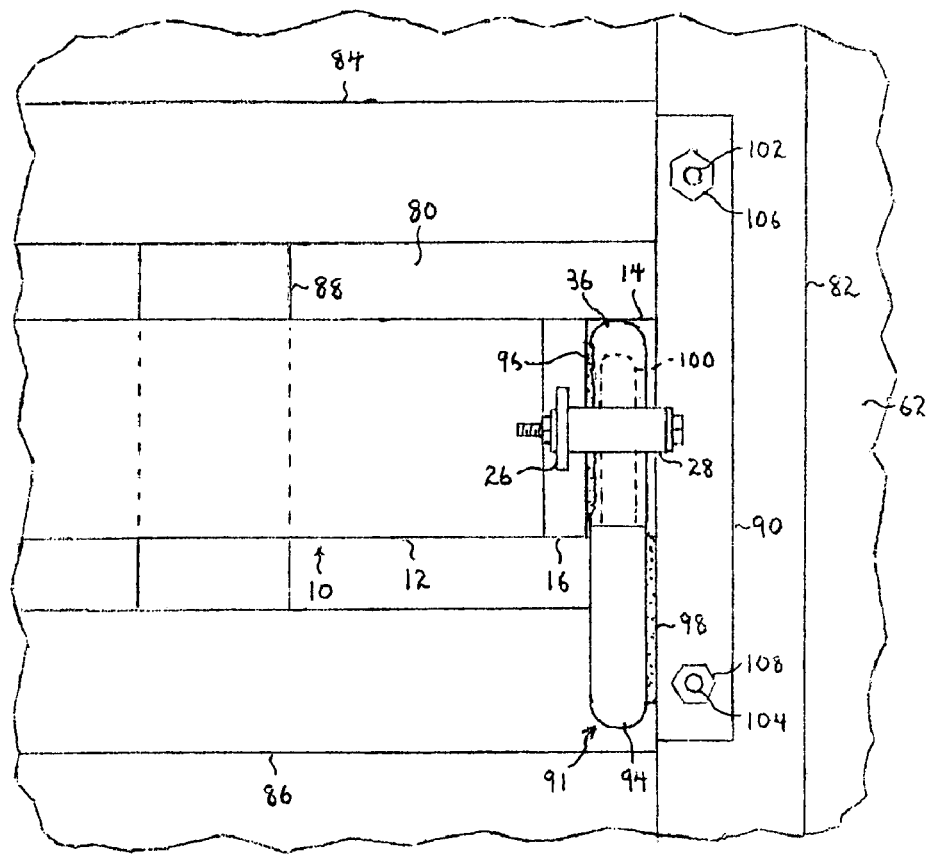
FIG. 4 is a fragmentary close-up view of the above-mentioned pivotal connection adjacent to a sidewall opening, which receives a portion of the bar therethrough.

Referring to FIG. 4, this close-up view shows opening 80 in sidewall 62 as well as braces 82, 84, 86, and 88 adjacent to and bordering the opening. A section of outer bar portion 12 obscures a portion of vertical brace 88, which is indicated by broken lines. Only a small part of inner bar portion 14 is visible in FIG. 4. It should be apparent from FIG. 4 that intermediate bar portion 16 is that portion of bar 10 which extends through opening 80. Bar stop 28, previously discussed in detail, is fixedly connected to intermediate bar portion 16 by means of flange 26. Pivot assembly 91 comprises pivot member 36 and another pivot member 94 as mated therewith. At least one weld 96 fixedly connects pivot member 36 to intermediate bar portion 16. Pivot member 94 is fixedly connected to connection member 90 with a weld as indicated at 98. Pivot member 94 has an upwardly extending pin 100 (preferably steel and indicated by broken lines) that is closely received by pivot member 36 in its previously discussed cavity defined therein. Accordingly, pivot member 36, as welded to intermediate bar portion 16, is adapted to freely turn or pivot around pin 100 (once, of course, the latch member referred to in FIG. 3 is appropriately positioned to allow such pivotal movement).

As previously mentioned, connection member 90 is bolted to vertical brace 82 and sidewall 62. A pair of bolts are received through sidewall 62 and vertical brace 82. End portions of the bolts, indicated at 102 and 104 in FIG. 4, extend from vertical brace 82 and threadedly receive thereon respective nuts 106 and 108 as snugly tightened against brace 82. Nuts 106 and 108 can be removed from bolts 102 and 104 to thereby allow removal of the bolts in the event one wants to remove bar 10 from the trailer for repair or replacement of the bar or components connected thereto. Once connection member 90 is unbolted from the trailer, inner bar portion 14 is simply pulled through opening 80 and pivot member 36 readily separates from pivot member 94.

Figure 5:
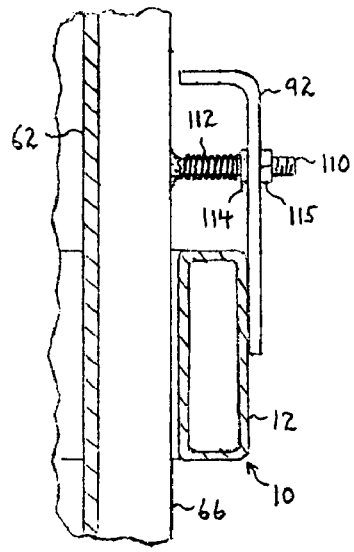
FIG. 5 is a view of a latch mechanism holding the bar in its retracted position, as viewed along line 5—5 in FIG. 3.

Referring to FIG. 5, this FIGURE shows a side view of latch member 92 and associated components, as well as a side view of vertical brace 66 and sidewall 62 in cross section. A section of bolt stock 110 extends from an end thereof, as welded to vertical brace 66, and through a hole (not shown) in latch member 92 to thereby allow pivotal movement of the latch member about the bolt stock. A spring 112 and a washer 114 are received over bolt stock 110 between vertical brace 66 and latch member 92. A lock nut 115 is threadedly received over an end portion of bolt stock 110 extending outwardly from latch member 92 so as to contact the latch member and place spring 112 under tension. Spring 112 biases outwardly against washer 114 and latch member 92, thereby assisting in keeping latch member 92 in a desired pivotal position. Outer bar portion 12 of bar 10 is shown in cross section in FIG. 5, and is engaged by latch member 92 in FIG. 5 to hold bar 10 in its retracted position as discussed above. The latch member is not shown in the subsequently described simplified schematic illustrations of FIGS. 6–8, but it is assumed to have been pivoted to a position as indicated by broken lines in FIG. 3 to allow pivotal movement of bar 10 in FIGS. 7 and 8.

Figure 6:
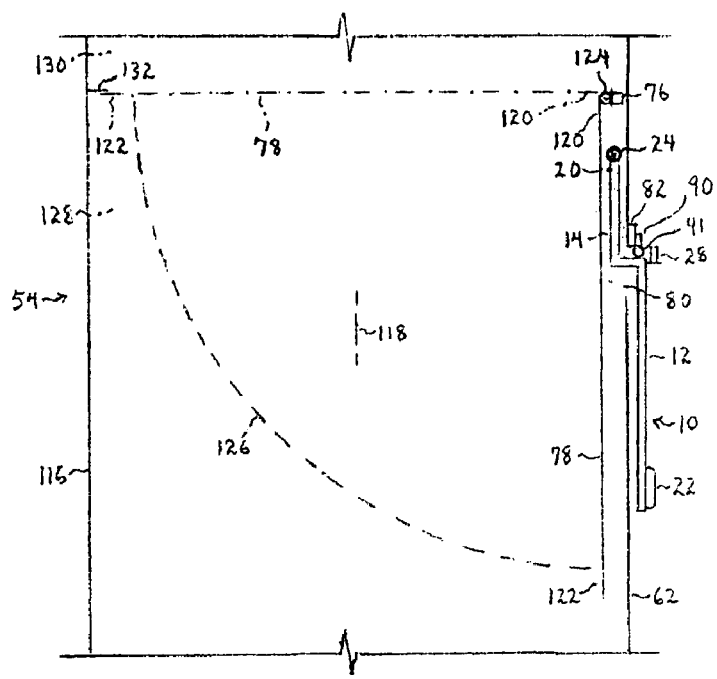
FIGS. 6–8 are schematic representations of a portion of the trailer, showing the manner in which the bar is pivoted from its retracted position to swingably move an internal divider gate from an open position to a closed position.

Referring to FIG. 6, this partial schematic drawing of trailer 54 shows sidewall 62 and an opposing sidewall 116 that define opposing sides of the trailer. Trailer 54 has a longitudinal axis 118 substantially parallel to the sidewalls. FIG. 6 further illustrates opening 80 in sidewall 62, vertical brace 82, connection member 90, pivot assembly 91, and bar 10 as pivotally mounted by means of the pivot assembly adjacent to opening 80. Illustrated components connected to bar 10 include handle 22, roller 24, and bar stop 28. Bar 10 is in its retracted position.

Internal divider gate 78 is shown as having a pivot end 120 and an opposing free end 122. Pivot end 120 is pivotally connected to post 76 at 124 adjacent to sidewall 62. Gate 78, as indicated by a solid line in its open position, longitudinally extends along and adjacent to sidewall 62 with free end 122 adjacent to sidewall 62. With gate 78 in its open position, bar 10 in its illustrated retracted position has inner bar portion 14 transversely positioned between and closely adjacent to the gate and sidewall 62. In the retracted position, bar 10 also has inner end 20 adjacent to pivot end 120 and longitudinally positioned between such pivot end and opening 80. In addition, outer bar portion 12 is closely adjacent to sidewall 62.

As further shown in FIG. 6, gate 78 is swingably movable through a swinging arc 126 between (i) the open position described above and represented by a solid line, and (ii) a closed position, represented by a phantom line, transversely extending between pivot end 120 adjacent to sidewall 62 and free end 122 adjacent to sidewall 116 to thereby define adjacent compartments 128 and 130. A gate stop 132 is schematically indicated as extending from sidewall 116.

Figure 7:
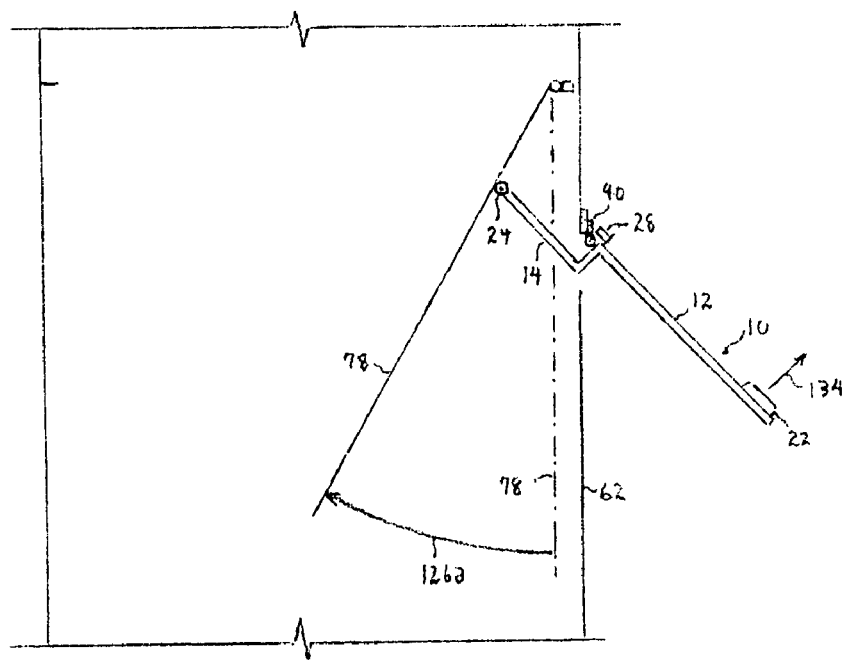

In use of the inventive apparatus, an operator (not shown) grasps handle 22 and pulls outwardly on outer bar portion 12 with a quick motion. As a result, bar 10 pivots from its retracted position to push gate from its open position. Referring to FIG. 7, bar 10 is shown after having pivoted so that outer bar portion 12 moves outwardly from sidewall 62 and inner bar portion 14 moves in the opposite direction to place roller 24 in rolling contact with the gate through a first portion 126a (hereafter "first arc portion") of the above-mentioned swinging arc from the open position, indicated by a phantom line, to that position indicated by a solid line. FIG. 7 further shows an arrow 134 indicating the outer pull on outer bar portion 12, as well as bar stop 28 adjacent to but not contacting connection member 90.

Figure 8:
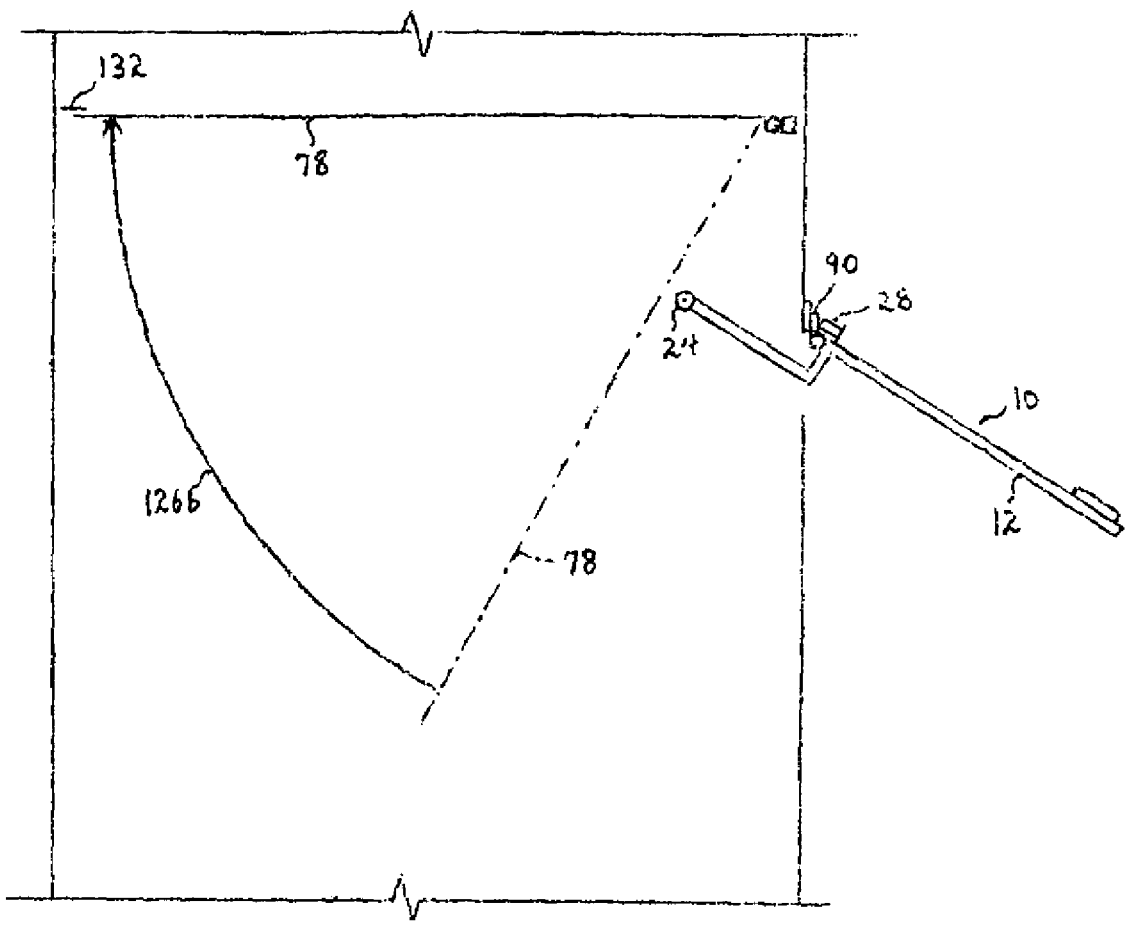

Further pivotal movement of bar 10, from that position in FIG. 7, results in roller 24 losing contact with gate 78. FIG. 8 shows bar 10 after such additional pivotal movement that is stopped upon contact of bar stop 28 with connection member 90. Bar stop 28 therefore limits the pivotal movement of bar 10. This serves as a safety feature in preventing an animal from causing pivotal movement of bar 10 back into the operator.

A phantom line in FIG. 8 indicates that position of gate 78 after moving through the above-mentioned first arc portion. Providing outer bar portion 12 had been pulled outwardly with sufficient force and speed, gate 78 will have gained adequate momentum to move through a second arc portion 126b and to the closed position (shown by a solid line) with roller 24 out of contact with the gate. Gate stop 132 stops the movement of gate 78, and a self-latching mechanism (not shown) would be provided to automatically latch the gate in place upon reaching the closed postion.

Accordingly and in view of the foregoing discussion, the invention provides a means by which an internal divider gate in a livestock trailer can be moved from an open position to a closed position from outside the trailer and with one's arms outside the trailer, thus minimizing the possibility of injury.

Obviously, many modifications and variations of the present invention are possible in light of the above teachings. For example, the bar could be solid in the form of a rod, which is bent to form the inner and outer bar portions. Or, the roller could be comprised of a first section of pipe received over but not connected to a second section of pipe, with the second section of pipe being fixedly connected to the inner end of the bar. The first section of pipe could thereby rotate about the second section of pipe and thus be rotatably connected to the inner end. It is, therefore, to be understood that within the scope of the appended claims the invention can be practiced otherwise than as specifically described.

That which is claimed is:

1. In a livestock transport vehicle having opposing first and second sides, a longitudinal axis substantially parallel to the first and second sides, and at least one internal divider gate with opposing pivot and free ends of which the pivot end is pivotally mounted within the vehicle adjacent to the first side so that the gate is swingably movable through a swinging arc between (i) an open position longitudinally extending along and adjacent to the first side with the free end adjacent to the first side, and (ii) a closed position transversely extending between the pivot end adjacent to the first side and the free end adjacent to the second side to thereby define adjacent compartments within the vehicle, wherein the first side has an opening and an apparatus for moving the gate from the open position to the closed position comprises:

a bar pivotally connected to the first side adjacent to the opening and received through the opening such that the bar has an outer bar portion, defining an outer end, outside the vehicle and an inner bar portion, defining an opposing inner end, inside the vehicle, wherein the bar in a retracted position when the gate is in its open position has the inner bar portion transversely positioned between and closely adjacent to the gate and first side, the inner end of the bar being adjacent to the pivot end of the gate and longitudinally positioned between such pivot end and the opening; and a roller rotatably connected to the inner end of the bar;

wherein the bar is pivotable from its retracted position upon movement of the outer bar portion outwardly from the first side and associated oppositely directed movement of the inner bar portion to place the roller in rolling contact with the gate from the open position and through a first portion of its swinging arc;

whereby the gate can be moved from its open position to its closed position, from outside the vehicle and with one's arms outside the vehicle, by pulling outwardly on the outer bar portion with sufficient force and speed to push the gate through the first portion of its swinging arc, with the roller in rolling contact with the gate, so as to gain adequate momentum to move through a second, remaining portion of the swinging arc and to the closed position with the roller out of contact with the gate.

2. An apparatus as recited in claim 1 wherein the vehicle is a trailer.

3. An apparatus as recited in claim 1 wherein the bar further has an intermediate bar portion connecting the inner and outer bar portions, the intermediate bar portion being that portion of the bar received through the opening and pivotally connected to the first side adjacent to the opening.

4. An apparatus as recited in claim 3 wherein the inner and outer bar portions are elongated, and the outer bar portion is longer than the inner bar portion.

5. An apparatus as recited in claim 4 wherein the inner and outer bar portions are out of line with and offset from one another.

6. An apparatus as recited in claim 5 wherein the bar in its retracted position has the outer bar portion closely adjacent to the first side.

7. An apparatus as recited in claim 1 further comprising a handle fixedly connected to the outer bar portion adjacent to the outer end of the bar, whereby the handle can assist in pulling outwardly on the outer bar portion.

8. An apparatus as recited in claim 1 further comprising a latch means selectively positionable over the outer bar portion to hold the bar in its retracted position when the apparatus is not in use.

9. An apparatus as recited in claim 1 further comprising a stop means for limiting the movement of the bar from its retracted position.

10. An apparatus as recited in claim 1 further comprising a shaft fixedly connected to the inner end of the bar, wherein the roller is rotatably mounted on the shaft to thereby be rotatably connected to the inner end.

* * * * *